United States Patent [19]

Mangiavacchi

[11] Patent Number: 4,592,736
[45] Date of Patent: Jun. 3, 1986

[54] TRIPOD CONSTANT-SPEED JOINT, IN PARTICULAR FOR THE TRANSMISSION OF A MOTOR VEHICLE

[75] Inventor: Jacques Mangiavacchi, Chatou, France

[73] Assignee: Glaenzer Spicer, Poissy, France

[21] Appl. No.: 782,612

[22] Filed: Oct. 1, 1985

Related U.S. Application Data

[63] Continuation of Ser. No. 561,208, Dec. 14, 1983, abandoned.

[30] Foreign Application Priority Data

Dec. 22, 1982 [FR] France .................................. 82 21553

[51] Int. Cl.$^4$ .............................................. F16D 3/20
[52] U.S. Cl. .................................... 464/111; 464/124; 464/905
[58] Field of Search ................. 464/111, 123, 124, 905

[56] References Cited

U.S. PATENT DOCUMENTS 4,167,860 9/1979 Sakaguchi et al. ................. 464/111
4,339,931 7/1982 Orain ................................... 464/111

FOREIGN PATENT DOCUMENTS 2173393 10/1973 France .
2298035 8/1976 France .
2420688 10/1979 France .
2448658 9/1980 France .

Primary Examiner—Stuart S. Levy
Assistant Examiner—Daniel P. Stodola
Attorney, Agent, or Firm—Wenderoth, Lind & Ponack

[57] ABSTRACT

A joint comprises a tripod element connected to a wheel shaft and provided with three trunnions on which are mounted rollers received in runways formed in a tulip element connected to a driving shaft. A mushroom element disposed in the tripod element bears against the tulip element, and a muzzle element axially retains the tripod element against the tulip element. The radius of curvature of the spherical dome of the mushroom element and/or of the tripod element is such that its center of curvature is offset toward the spherical dome relative to the axial plane of the tripod element. This arrangement eliminates vibrations and seizure which are liable to occur for intermediate angles of operation of the joint.

3 Claims, 5 Drawing Figures

TRIPOD CONSTANT-SPEED JOINT, IN PARTICULAR FOR THE TRANSMISSION OF A MOTOR VEHICLE

This application is a continuation of now abandoned Ser. No. 561,208, filed Dec. 14, 1983.

BACKGROUND OF THE INVENTION

It is known that joints of the tripod constant speed type comprise a tripod element connected to a first shaft and provided with three trunnions on which spherical rollers are rotatively and slidably mounted and are received in runways formed in a tulip element connected to a second shaft. The tripod joints of the fixed type further comprise means for axially retaining the tripod element in the tulip element and comprising spherical domes carried by the tripod element and bearing against corresponding surfaces carried by the tulip element.

French patent No. 2,420,688 discloses such a tripod joint in which the bearing surfaces carried by the tulip element include in their central zones concave cavities the radii of curvature of which are slightly greater than those of the spherical surfaces rigid with the tripod element. Thus, as the tulip element is maintained axially against the tripod element by means of a muzzle constituting a resiliently yieldable fastener, this muzzle is in contact with the spherical surface of the tripod element through a spherical cavity whose radius is approximately equal to the radius of the tripod element and is formed in the planar surface of the muzzle.

As concerns the tulip element, it is in contact with the spherical bearing surface of a mushroom element which is slidably mounted in the tripod element by a spherical cavity whose radius is approximately equal to the radius of the spherical dome of the mushroom element and formed in the planar surface of the tulip element.

These small spherical cavities, also termed hereinafter "lunules", are aligned on the axis of the joint when the latter is not operating with the two shafts out of alignment. The lunules enable the pressures of the surfaces in contact under the load created by the mounting of a packing member whose thickness is slightly greater than the axial clearance measured between the confronting planar surfaces of the mushroom element and the tripod element to be considerably reduced.

The lunules remain substantially centered on the centre of the sphere of the tripod element for the most frequent operating angles of the joint, thus resulting in a decrease in the pressure of contact which is practically constant. On the other hand, when operating at a large angularity, an axial clearance appears between the mushroom element and the tripod element, this clearance being sufficient to result in the disappearance of the pre-stressing created by the packing element. It is then a spring, which is disposed inside the sphere of the tripod element and biases the mushroom element, which becomes operative for maintaining the tulip element axially.

It is with angularities between the relatively small angularity normally met with and the maximum angularity that the presence of the lunules is liable to present drawbacks. Indeed, when the joint operates at an angle, the tulip element becomes offcentre by a given angular value relative to the sphere of the tripod element and the mushroom element. Thus, the contact between the mushroom element and the tulip element and the contact between the tripod element and the muzzle no longer occur on the lunules but on the planar parts of the tulip element and the muzzle element, which has for result, for a given load, to multiply the Hertzian pressures by two in such a case.

Further, the offcentre produced causes the spherical domes of the tripod element and the mushroom element to leave the lunules and this results in an additional deflection of the muzzle element equal to twice the depth of the lunules. Consequently, there is a doubling of the load on the surfaces in contact.

Lastly, the effects due to the disengagement from the lunules are combined with those of the increase in the load and the initial Hertzian pressures are multiplied by three. Consequently, there are obtained conditions which encourage the appearance of noise and seizure of the spherical surfaces of the mushroom element and the tripod element produced by sliding under a critical load for lubrication.

SUMMARY OF THE INVENTION

An object of the invention is to overcome these drawbacks in such a way that the distance between two planes which are parallel and tangent to the spherical domes carried by the tripod element and consequently the load, decreases with the angular operation of the joint in such a way that the Hertzian pressure remains within reasonable limits.

According to the invention, the radius of curvature of at least one spherical dome of the tripod element is such that its centre of curvature is offset toward the spherical dome relative to the median axial plane of the tripod element, perpendicular to the axis of the tulip element.

Indeed, it can be verified that such a profile of the spherical bearing surfaces of contact of the tripod element, or of only one of these bearing surfaces, permits achieving the desired decrease in the distance between the two aforementioned parallel planes when the angularity of the joint increases.

According to the invention, there is provided an offset between the centre of curvature of the spherical dome(s) of the tripod element and the axial plane of the tripod element which is between zero and about 40 times the depth of the lunules.

However, the presence of these lunules is not indispensable for carrying out the invention which only requires the aforementioned offset between the centre of curvature in question and the axial plane of the tripod element.

BRIEF DESCRIPTION OF THE DRAWINGS

Other features and advantages of the invention will be apparent from the following description with reference to the accompanying drawings which illustrate an embodiment which is a non-limiting example, and wherein.

DETAILED DESCRIPTION OF THE INVENTION

Figure 1:
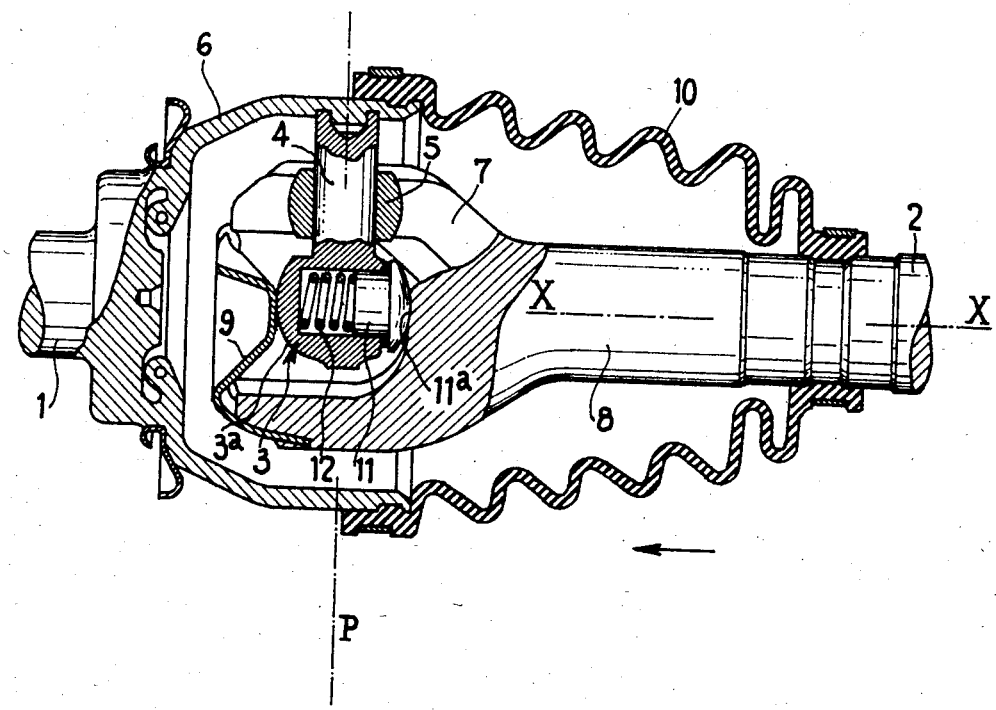
FIG. 1 is a longitudinal and partial elevational view of a constant-speed joint of the tripod type according to the invention.
Figure 2:
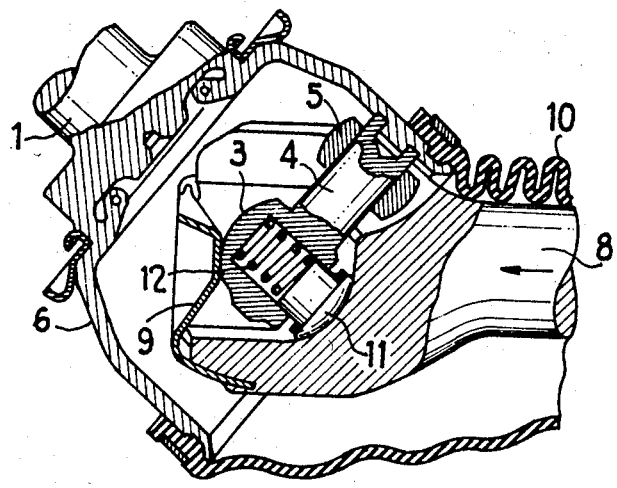
FIG. 2 is a view similar to FIG. 1 of the joint operating at a large angle.

FIGS. 1 and 2 show a constant-speed joint of the tripod type interconnecting two shafts 1 and 2, the first shaft 1 of which may be secured to a wheel stub-axle (not shown), while the second shaft 2 may be driven by a motor-drive unit of a motor vehicle.

The joint comprises a tripod element formed by a hub 3 and three arms or trunnions 4 extending radially and being separated by equal angular sectors, spherical rollers 5 being rotatively and slidably mounted on the trunnions 4. The latter are fixed to a bell or bowl element 6 rigid with the shaft 1, a sealing bellows or gaiter 10 connecting the bowl element 6 to the shaft 2. The rollers 5 are received in runways 7 of circular section formed in an element 8 termed a tulip element which is carried by the shaft 2.

The joint comprises means for axially retaining the tripod element 3, 4 in the tulip element 8 which comprise a muzzle element 9 constituted by a resiliently yieldable fastener hooked in the known manner to the branches of the tulip element. A mushroom element 11 is axially slidably mounted in the hub 3 of the tripod element and is subjected to the resilient biasing of a spring 12 located inside the hub 3 and tending to maintain the head of the mushroom element 11 applied against the confronting surface of the tulip element 8. The hub 3 and the mushroom element 11 have respectively spherical domes 3a and 11a for axially retaining the tripod element in the tulip element 8 and which bear against corresponding surfaces on the muzzle element 9 and the tulip element 8.

Figure 3:
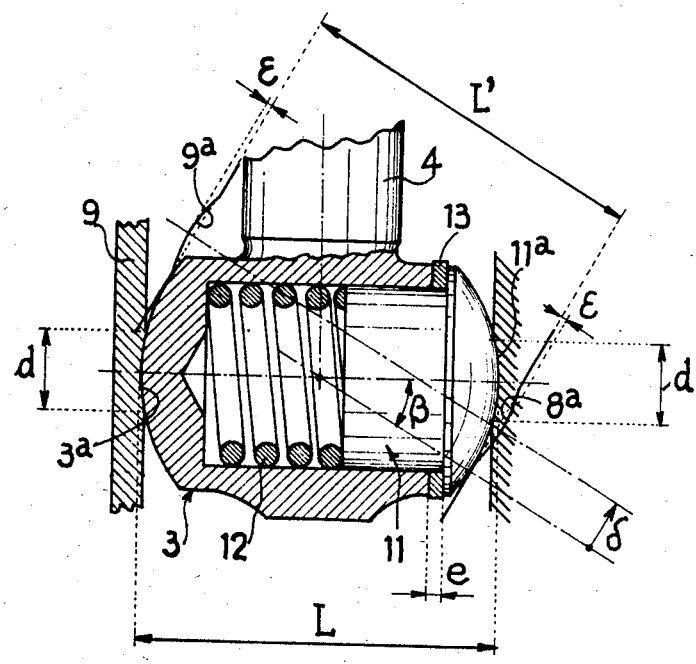
FIG. 3 is a half-sectional, half-elevational view, to an enlarged scale, of the sphere of the tripod element, of the mushroom element slidably mounted in the last-mentioned sphere and of their surfaces of contact arranged in accordance with the invention.

In the embodiment illustrated in the drawings, the bearing surfaces of the tulip element 8 and the muzzle element 9 have respectively in their central zones concave cavities 8a and 9a (FIG. 3), termed "lunules" whose radii of curvature are substantially greater than those of the corresponding spherical domes 11a and 3a in accordance with the aforementioned French patent, these lunules 8a, 9a having a given depth $\Sigma$. The domes 3a, 11a have a diameter d corresponding to the diameter of the lunules 9a, 8a so as to be capable of being placed therein and aligned on the axis of the joint when the latter is not operating at an angle. The lunules 8a, 9a permit, as already mentioned, a considerable reduction in the pressures of the surfaces under contact under the load created by the mounting of an annular packing element 13 which is coaxial with the axis X—X of the tulip element 8 and interposed between the mushroom element 11 and the hub 3 of the tripod element (FIG. 3). The thickness e of the packing element 13 is slightly greater than the axial clearance measured between the planar surfaces of the mushroom element 11 and the tripod element 3.

Figure 4:
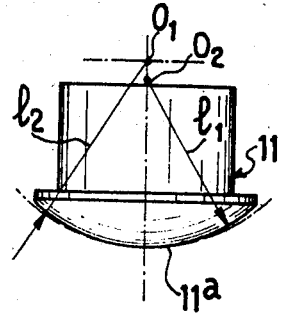
FIG. 4 is an elevational view of the mushroom element of FIG. 3 showing the offset between the centre of curvature of the spherical dome of this mushroom element and the axial plane of the tripod element.
Figure 5:
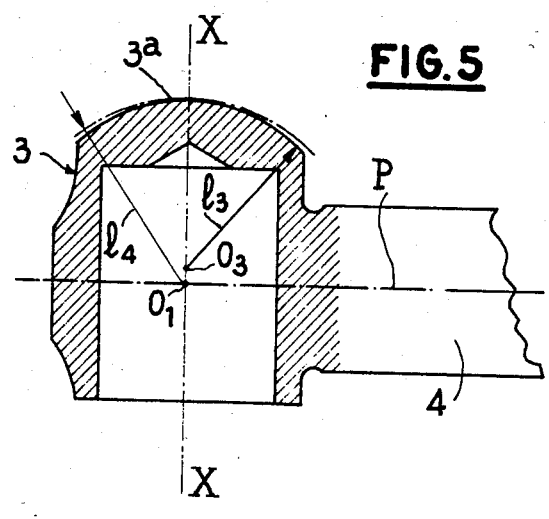
FIG. 5 is a partial sectional view, with a part cut away, of the hub of the tripod element, illustrating the offset of the centre of curvature of the spherical dome of the latter relative to the axial plane of the tripod element.

According to the invention, the radius of curvature $l_1$ (FIG. 4) of the spherical dome 11a of the mushroom element 11 and/or the radius of curvature $l_3$ of the spherical dome 3a of the tripod element 3 is so determined that its centre of curvature (respectively $O_2$ and $O_3$) is offset toward the corresponding spherical dome 11a, 3a relative to the median axial plane P of the tripod element 3, 4 perpendicular to the axis X—X of the tulip element 8 (FIG. 5).

Indeed, this offset may concern only one or the other of the two considered elements, namely the tripod element 3 and the mushroom element 11, or both of them. In the case where the two elements 3, 11 have this offset, then the offset is equally divided between each thereof, as in the embodiment illustrated in FIGS. 4 and 5.

As concerns the mushroom element 11, the offset $O_1$ and $O_2$ is equal to the distance between the centres of curvature $O_1$ and $O_2$ of two spherical domes which are coaxial and tangent to each other at their centre, the first spherical dome, having a centre of curvature $O_1$ and a radius $l_2$, being shown in dot-dash lines (FIG. 4), its centre $O_1$ being contained in the axial plane P of the tripod element 3. Likewise, the offset $O_1 O_3$ of the centre of curvature $O_3$ of the dome 3a of the tripod element 3 is the distance between the centre of curvature $O_1$ of a spherical dome shown in dot-dash lines (FIG. 5) and having a radius $l_4$ contained in the axial plane P, and the centre of curvature $O_3$ of the dome 3a having a radius $l_3$. Thus, $l_3$ is slightly less than $l_4$, and $l_1$ is sligthly less than $l_2$.

In practice, the sum of the offsets $O_1 O_2 + O_1 O_3$ may be within a range from zero to about 40 times the depth $\Sigma$ of the lunules 8a and 9a (the zero value being excluded apart from manufacturing tolerances). However, preferably, this total offset is about 20 times the depth of the lunules. It may be divided in any way between $O_1 O_2$ and $O_1 O_3$.

By way of an illustrative numerical example, if $$\Sigma = 0.1 \text{ mm}, O_1 O_2 + O_1 O_3 = 2 \text{ mm}.$$

Under these conditions, it is found that, under great angularity $\beta$ of the joint (FIG. 3) corresponding to an offcentre $\delta$ which causes the domes 3a and 11a to leave the lunules 9a, 8a, the distance L' between the planes tangent to said spherical domes 3a, 11a is less than the sum L of the radii $l_1$ and $l_3$ of the mushroom element 11 and the tripod element 3. Tests carried out have revealed that the Hertzian pressure remains within reasonable limits.

It must be understood that the scope of the invention is not intended to be limited to the described embodiment and that the invention may be in particular applied to a tripod joint devoid of lunules which could then operate in a satisfactory manner in geometric situations which would otherwise tend to give rise to phenomena of noise and seizure. The invention may also be carried out irrespective of the manner in which the spherical domes or bearing surfaces of the hub of the tripod element are constructed.

What is claimed is:

1. A tripod constant-speed joint, in particular for a motor-vehicle transmission, said joint comprising:
   a tripod element for connection to a first shaft and having three trunnions;
   spherical rollers rotatively and slidably mounted on said trunnions;
   a tulip element for connection to a second shaft and defining runways;
   said rollers being engaged in said runways;
   means defining first and second spherical bearing surfaces carried by said tulip element, said spherical bearing surfaces having in central zones thereof respective concave cavities defining lunules;

said tripod element having a first spherical dome;

a mushroom element slidably mounted in a hub of said tripod element and defining a second spherical dome;

said tripod element being retained in said tulip element with said first and second spherical domes bearing against said first and second spherical bearing surfaces, respectively;

said lunules having radii of curvature substantially greater than radii of curvature of respective said spherical domes;

said radii of curvature of both said spherical domes being defined by respective centers of curvature, each said center of curvature being offset toward the respective said spherical dome relative to a median axial plane of said tripod element which is perpendicular to the axis of said tulip element; and packing means, positioned between said mushroom element and said hub of said tripod element, for creating an axial load urging said spherical domes away from each other toward respective said spherical bearing surfaces and for preventing said center of curvature of said second spherical dome from moving to said median axial plane.

2. A joint as claimed in claim 1, wherein said lunules having a given depth, and said centers of curvature of both said spherical domes are spaced from said median axial plane by distances whose sum is between greater than zero and less than about 40 times said given depth of said lunules.

3. A joint as claimed in claim 2, wherein said centers of curvature of said spherical domes are spaced from said median axial plane by distances whose sum is about 20 times said given depth of said lunules.

* * * * *